(12) United States Patent
Audet

(10) Patent No.: US 10,935,504 B1
(45) Date of Patent: Mar. 2, 2021

(54) EQUIPMENT INSPECTION APPARATUS

(71) Applicant: Daniel Audet, Gibbons (CA)

(72) Inventor: Daniel Audet, Gibbons (CA)

(*) Notice: Subject to any disclaimer, the term of this patent is extended or adjusted under 35 U.S.C. 154(b) by 0 days.

(21) Appl. No.: 16/798,564

(22) Filed: Feb. 24, 2020

(51) Int. Cl.
*G01N 21/954* (2006.01)

(52) U.S. Cl.
CPC .................................. *G01N 21/954* (2013.01)

(58) Field of Classification Search
CPC ............ G02B 23/2476; G02B 23/2492; G02B 23/24; G01N 21/954
See application file for complete search history.

(56) References Cited

U.S. PATENT DOCUMENTS

| | | | | |
|---|---|---|---|---|
| 5,355,818 A * | 10/1994 | Strait | ...................... | B63B 71/00 114/73 |
| 5,724,133 A * | 3/1998 | Meadows | .......... | G02B 23/2484 356/241.1 |
| 2002/0097321 A1* | 7/2002 | McBride | ............ | G02B 23/2484 348/148 |
| 2004/0006448 A1* | 1/2004 | Penza | ................ | G02B 23/2484 702/183 |
| 2006/0066847 A1* | 3/2006 | Penza | ................ | G01N 21/8806 356/241.1 |
| 2007/0252972 A1* | 11/2007 | Lindner | ................. | G01N 21/94 356/4.01 |
| 2009/0028543 A1* | 1/2009 | Park | ....................... | G03B 17/00 396/428 |
| 2009/0180110 A1* | 7/2009 | Drost | ................... | G01N 21/954 356/241.1 |
| 2018/0324335 A1* | 11/2018 | Hubbard | ................ | F16M 11/24 |

* cited by examiner

*Primary Examiner* — Steven Whitesell Gordon
(74) *Attorney, Agent, or Firm* — Orin Del Vecchio

(57) ABSTRACT

An inspection apparatus configured to provide assistance in the inspection of an object such as but not limited to a petrochemical vessel or pipeline. The inspection apparatus of the present invention includes a support pole wherein the support pole has an inspection assembly mounted to the second end thereof. The inspection assembly includes a base mount having an upper mounting plate and a lower mounting plate secured to the upper surface and lower surface respectively. A plurality of light mounts are secured to the upper mounting plate and the lower mounting plate each having a light secured thereto. The inspection assembly is moveably mounted to the support pole utilizing a first arm assembly and a second arm assembly. An additional pole member having a reel assembly with a steel cable is further included to provide control and manipulation of the inspection assembly.

18 Claims, 4 Drawing Sheets

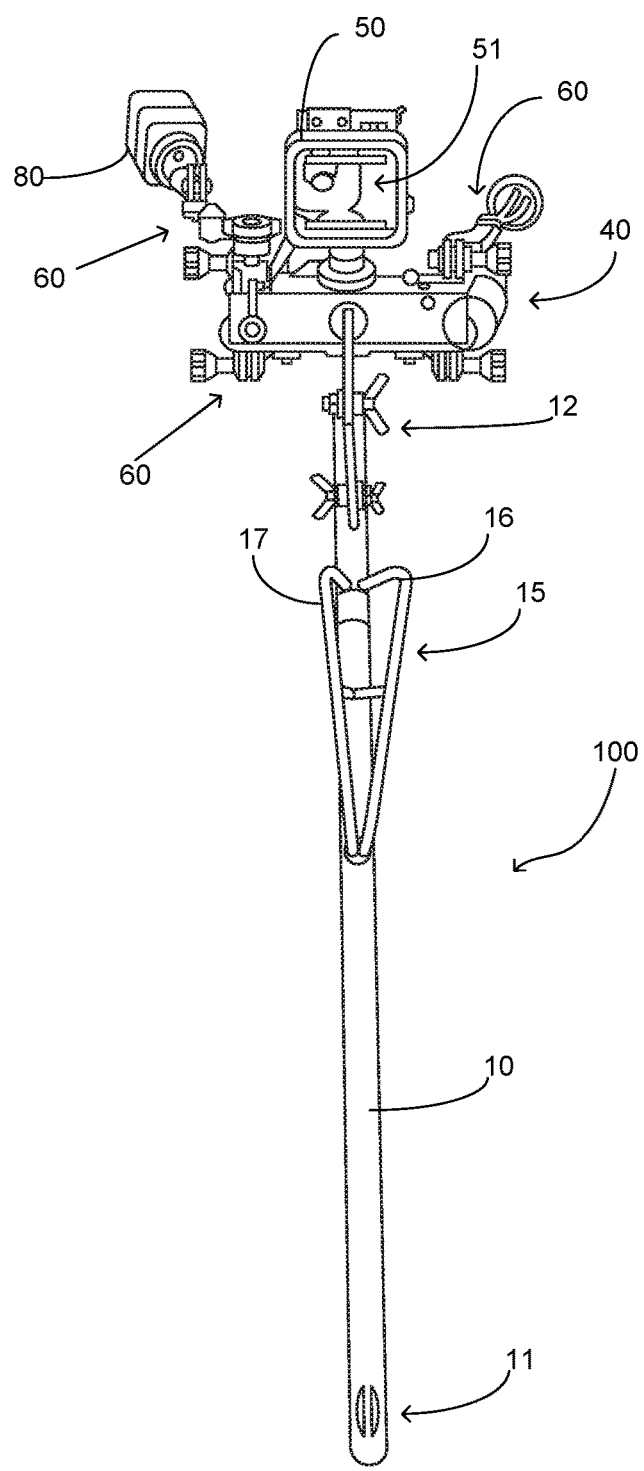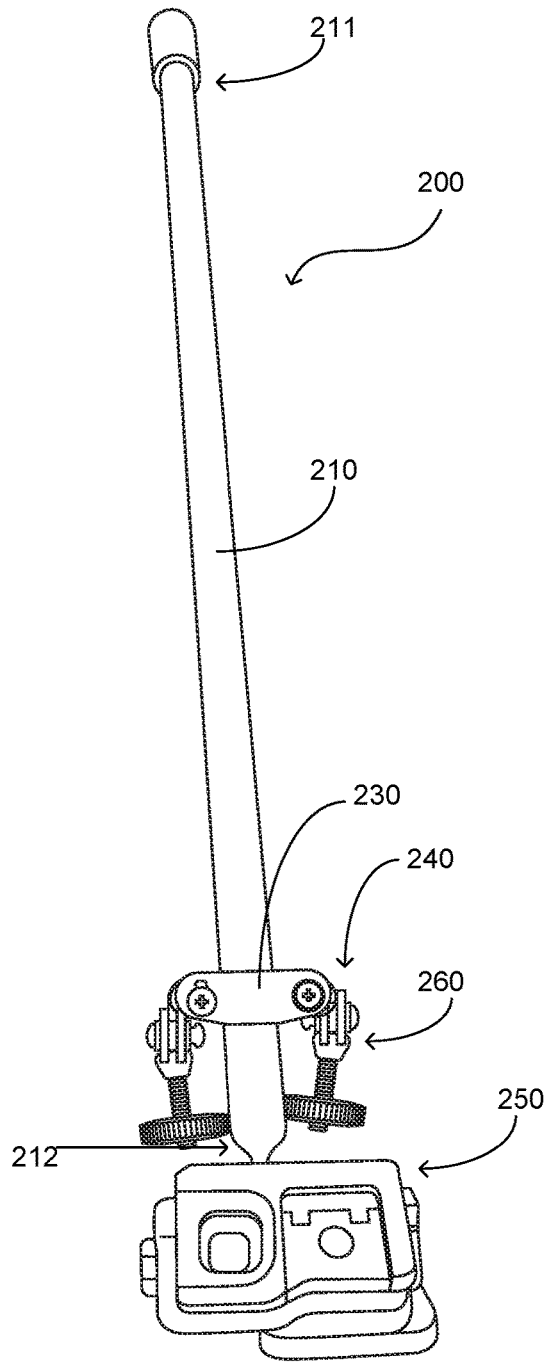
FIG. 4
FIG. 5

EQUIPMENT INSPECTION APPARATUS

FIELD OF THE INVENTION

The present invention relates generally to inspection apparatus, more specifically but not by way of limitation, an equipment inspection apparatus that is configured to facilitate high level internal inspection of equipment such as but not limited to process piping and processing equipment in fields such as but not limited to petrochemical processing.

BACKGROUND

Petrochemical processing is a complicated and expensive process that employs highly sophisticated chemical plants wherein the plants deploy specialized equipment to facilitate desired processes. Refining of chemicals can require utilization of many different types of equipment and processes wherein the processes are often executed utilizing different equipment and piping that is configured to transfer the material in between the various different equipment. Most of the equipment and piping is typically manufactured from metal or other similar material and is often welded during the assembly and/or manufacturing process. Visual inspections of not only the welds but also the structural integrity of the equipment and/or piping is a routine requirement in order to maintain compliance with various safety requirements.

One method of visual inspections that is often performed is the utilization of a camera. Cameras can be loaded into the interior volume of the equipment or piping and provide photographic recording of the interior. This photographic recording is then visually analyzed for indications of wear or other potential structural hazards. These inspections must sometimes take place while the equipment is in use. Standard cameras have proven ineffective for performing inspections during use as the environment is often very corrosive and can damage the cameras. Another issue with utilization of standard cameras is the lack of proper lighting. While most cameras are equipped with at least one flash, these flash elements do not provide sufficient light within the interiors of the equipment or pipe that is utilized in a petrochemical environment.

Accordingly, there is a need for an apparatus that is configured to provide assistance in the visual inspection of petrochemical process equipment and piping wherein the apparatus is operable to capture photographic recordings but further constructed to be more easily introduced into the aforementioned equipment and additionally be able to move media and withstand a corrosive environment.

SUMMARY OF THE INVENTION

It is the object of the present invention to provide an apparatus operable to provide inspection of equipment and piping utilized in the petrochemical industry wherein the apparatus of the present invention includes a base support pole member.

Another object of the present invention is to provide an inspection apparatus for pipe and other vessels that require routine safety inspections wherein the apparatus of the present invention includes a base mount that is movably secured to a second end of the base support pole member.

A further object of the present invention is to provide an apparatus operable to provide inspection of equipment and piping utilized in the petrochemical industry wherein the base mount includes an upper mounting plate and a lower mounting plate on opposing sides thereof.

An additional object of the present invention is to provide an inspection apparatus for pipe and other vessels that require routine safety inspections wherein the base mount further has operably coupled thereto a plurality of pivotal mounting arms.

Yet a further object of the present invention is to provide an apparatus operable to provide inspection of equipment and piping utilized in the petrochemical industry wherein the pivotal mounting arms are configured to have releasably secured thereto a light emitting element.

A further object of the present invention is to provide an inspection apparatus for pipe and other vessels that require routine safety inspections wherein the base mount is secured utilizing a pivoting support member and an arm assembly.

Another object of the present invention is to provide an apparatus operable to provide inspection of equipment and piping utilized in the petrochemical industry wherein the present invention further includes a protective case for a camera.

An additional object of the present invention is to provide an inspection apparatus for pipe and other vessels that require routine safety inspections wherein the base mount further includes a clearing element wherein the clearing element includes a nozzle operable to eject a fluid forward of the protective case for the camera.

Still a further object of the present invention is to provide an apparatus operable to provide inspection of equipment and piping utilized in the petrochemical industry wherein the base support pole member includes a handle member and an additional telescoping member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 4 is a perspective view of the present invention; and

FIG. 5 is a perspective view of an alternative embodiment of the present invention.

DETAILED DESCRIPTION

Figure 1:
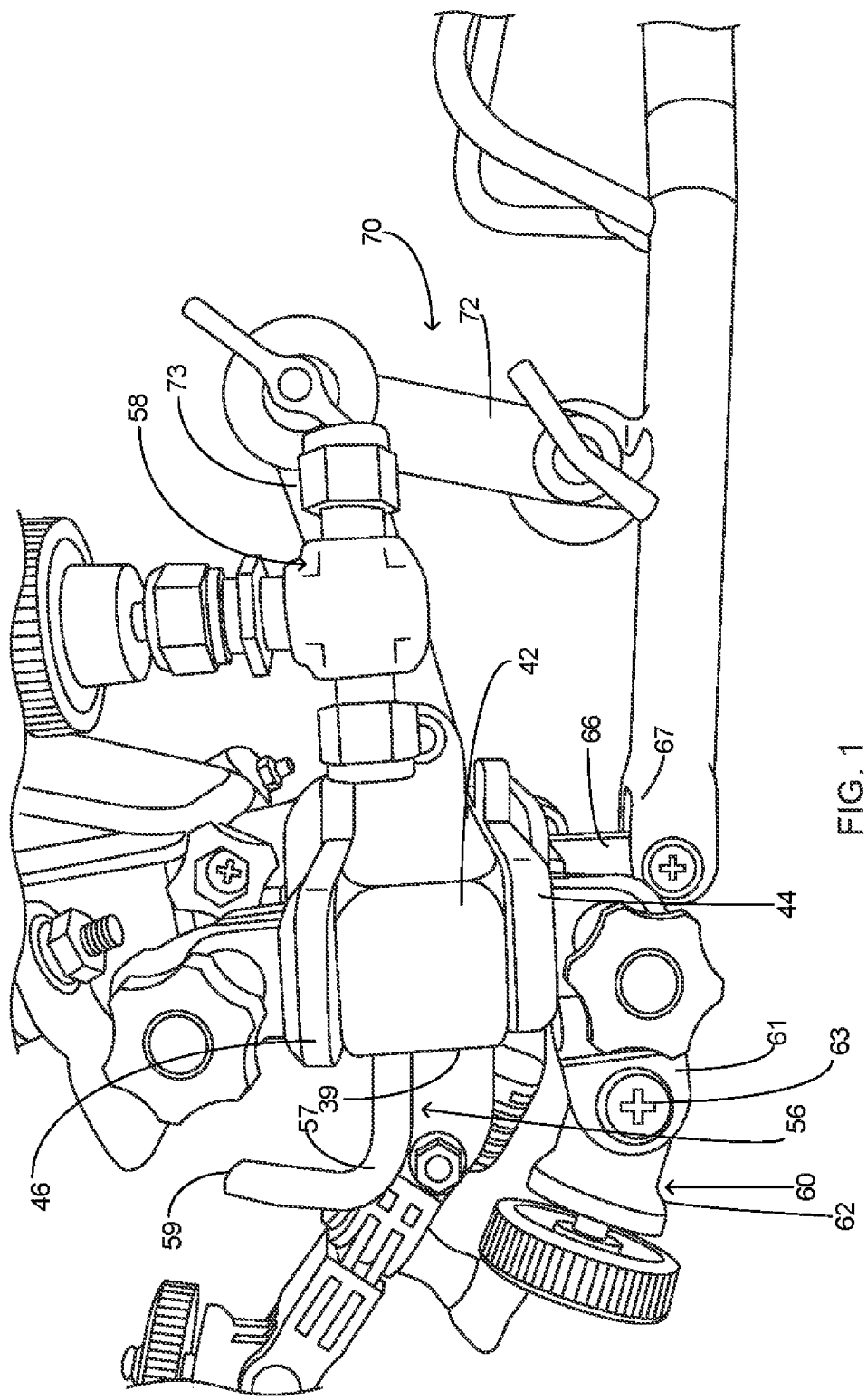
FIG. 1 is a detailed view of the base mount of the present invention.

Referring now to the drawings submitted herewith, wherein various elements depicted therein are not necessarily drawn to scale and wherein through the views and figures like elements are referenced with identical reference numerals, there is illustrated an equipment inspection apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith the equipment inspection apparatus 100 includes a support pole member 10. The support pole member 10 is manufactured from a durable non-corrosive material and is manufactured in various lengths. The support pole member 10 includes a first end 11 and second end 12 wherein during use the second end 12 is journaled into the interior volume of the object being inspected such as a petrochemical vessel or pipe. The support pole member 10 further has secured thereto a handle member 15. The handle member 15 includes a first portion 16 and second portion 17 wherein the first portion 16 and second portion 17 are angularly oriented with respect to each other. The angular orientation of the first portion 16 and second portion 17 provide an improved leverage for a user engaging the handle member 15 wherein the user is wearing a large glove. While the handle member 15 is illustrated and discussed having a particular structure herein, it is contemplated within the scope of the present invention that the handle member 15 could be provided in alternate forms and sizes and still achieve the desired objective.

Figure 2:
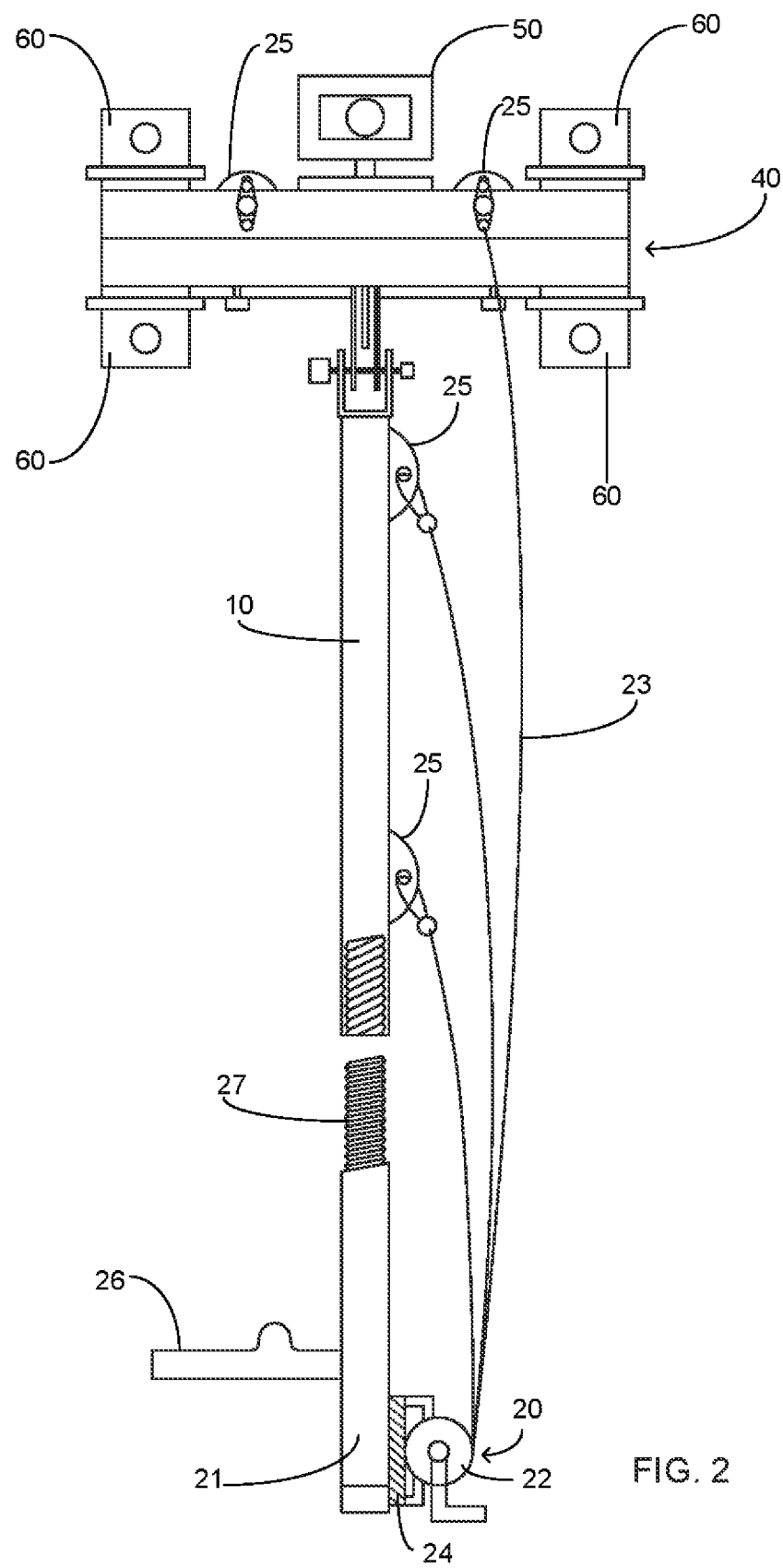
FIG. 2 is a perspective view of the present invention.
Figure 3:
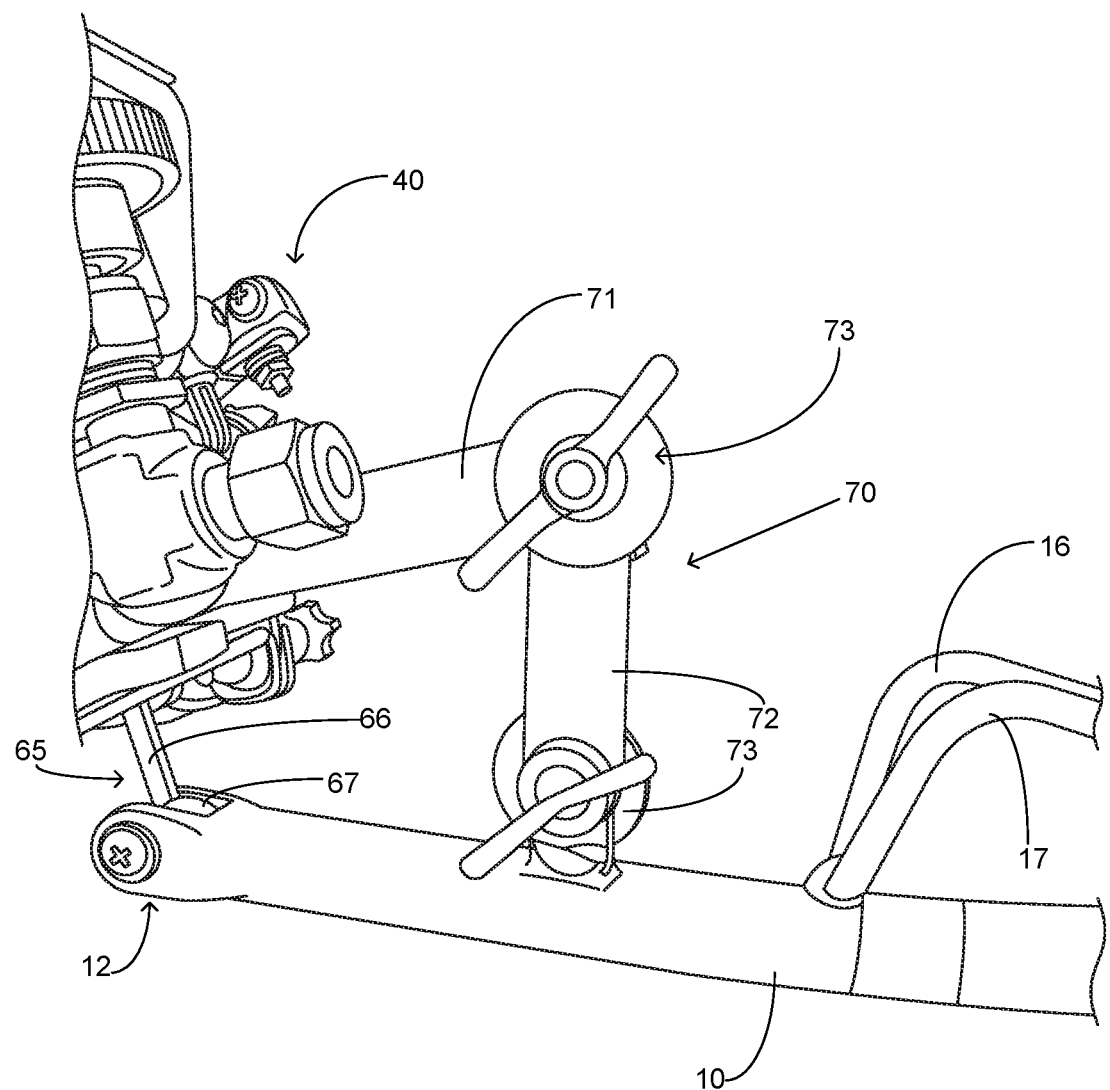
FIG. 3 is a detailed view of the arm assembly of the present invention.

Referring in particular to FIG. 2 submitted herewith, the support pole member 10 can be configured with a reel assembly 20. The reel assembly 20 is provided with an additional pole member 21 being operably secured thereto utilizing suitable durable techniques. The reel assembly 20 includes a wheel 22 that is configured to receive, store and dispense steel cable 23. The cable 23 extends from the reel assembly 20 and is secured to a plurality of keepers 25. The reel assembly 20 is mounted to the pole member 21 on a mounting plate 24 opposite handle portion 26. Pole member 21 includes threads 27 that facilitate the operable coupling of the pole member 21 to the support pole member 10. The reel assembly 20 is utilized to provide enhanced control of the support pole member 10 and the inspection assembly 40.

The inspection assembly 40 is movably coupled to the second end 12 of the support pole member 10. The inspection assembly 40 is configured to provide illumination of an area being visually inspected by a user of the equipment inspection apparatus 100 and further provide video and/or photographic images thereof. The inspection assembly 40 includes a base mount 42 that is manufactured from a durable rigid material. In a preferred embodiment the base mount 42 is rectangular in shape. The base mount 42 has secured thereto an upper mounting plate 44 and a lower mounting plate 46. The upper mounting plate 44 and lower mounting plate 46 are secured to the base mount 42 utilizing suitable durable techniques and are manufactured from a suitable durable material. As is further discussed herein the upper mounting plate 44 and lower mounting plate 46 are configured to have the light mounts 60 secured thereto.

Superposed the lower mounting plate 46 is a case member 50. Case member 50 is manufactured from a durable waterproof material and is movably secured to the upper mounting plate 44. The case member 50 includes an interior volume that is of suitable size to receive and store conventional image capturing equipment such as but not limited to a digital camera. It is contemplated within the scope of the present invention that the case member 50 could be provided in alternate sizes and shapes in order to receive various types of image capturing equipment. The base mount 42 has operably coupled therewith a clearing element 56. The clearing element 56 includes a nozzle 57 and valve assembly 58 wherein the nozzle 57 is operably coupled to the front surface 39 of the base mount 42. The nozzle 57 is operably coupled to the valve assembly 58 so as to receive a gas therefrom. The valve assembly 58 is configured to be operably coupled to a pressurized gas line such as but not limited to compressed air. The nozzle 57 is formed in a shape so as to place tip 59 adjacent to the case member 50. If required during use of the equipment inspection apparatus 100, the user can open the valve assembly 58 so as to facilitate introduction of a compressed gas or liquid into the nozzle 57. The compressed gas will provide a disturbance of the area adjacent to and in front of the case member 50 which can remove desired objects in order to permit capture of an improved photographic image from the image capturing device housed in the case member 50.

The inspection assembly 40 is movably mounted to support pole member 10 utilizing a first arm assembly 65 and a second arm assembly 70. The first arm assembly 65 and second arm assembly 70 are configured to provide movement of the inspection assembly 40 so as to facilitate the desired positioning of the inspection assembly 40. The first arm assembly 65 includes arm 66 having coupler 67 formed therewith wherein the coupler 67 is movably secured within the end 12 of the support pole member 10. The arm 66 is secured to the upper mounting plate 44 utilizing suitable durable techniques. The second arm assembly 70 includes first portion 71 and second portion 72 that are movably coupled utilizing fasteners 73. The first portion 71 and second portion are pivotally movable and provide the ability for pivotal movement of the inspection assembly 40 with the fasteners 73 providing the ability to retain a desired position of the inspection assembly 40 ensuing movement of the second arm assembly 70 to a desired position. It is contemplated within the scope of the present invention that the first arm assembly 65 and second arm assembly 70 could be configured in alternate manners and it should be further understood that the desired objective thereof is to provide movement of any direction of the inspection assembly 40 and retain in a desired position.

The inspection assembly 40 further includes a plurality of light mounts 60. The light mounts 60 are operable to movably secure lights 80. Lights 80 are provided so as to illuminate the area in front of the inspection assembly 40 so as to ensure the ability to visually inspect and capture the desired photographic images of the interior of the object being inspected. The light mounts 60 include a first portion 61 and second portion 62 that are movably coupled. Fastener 63 is provided so as to secure the first portion 61 and second portion in the desired position ensuing movement thereto. In a preferred embodiment the inspection assembly 40 includes four light mounts 60 but it should be understood within the scope of the present invention that the inspection assembly 40 could include as few as one light mount 60 or more than four light mounts 60. Additionally, it should be understood within the scope of the present invention that the light mounts 60 could be constructed utilizing alternate elements and/or techniques in order to facilitate achievement of movably mounting the lights 80.

Lights 80 are conventional waterproof lights that are cube shaped and powered by and internal power supply. It should be understood within the scope of the present invention that various types of conventional lights could be utilized and secured to the inspection assembly 40. The lights 80 in a preferred embodiment of the present invention are LED lights and have at least three thousand lumens.

Referring now in particular to FIG. 5, an alternative embodiment of the equipment inspection apparatus 200 is illustrated therein. The equipment inspection apparatus 200 includes a support pole 210 having a first end 211 and second end 212. The support pole 210 has operably coupled thereto an inspection assembly 240 having a mounting bracket 230 wherein the mounting bracket 230 has secured thereto two light mounts 260. A case member 250 is operably secured to the second end 212 of the support pole 210. The light mounts 260 are configured to have lights(not illustrated herein) operably coupled thereto and provide movable mounting thereof so as to place in a desired position.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A equipment inspection apparatus that is configured to provide inspection of an interior portion of an object such as a vessel or pipe wherein the equipment inspection apparatus comprises:

a support pole member, said support pole member having a first end and a second end;

an inspection assembly, said inspection assembly being movably secured to said second end of said support pole member, said inspection assembly including a base mount, said base mount having a lower surface and an upper surface, said base mount having an upper mounting plate secured to said upper surface, said base mount having a lower mounting plate secured to said lower surface;

at least one light mount, said at least one light mount being secured to said inspection assembly, said at least one light mount having a light secured thereto, said at least one light mount providing movable adjustment of the light;

a case member, said case member being secured to said inspection assembly, said case member configured to house imaging equipment, and a clearing element, said clearing element being operably coupled to said base mount, said clearing element having a nozzle, said nozzle having an end proximate to said case member, said clearing element configured to discharge a compressed gas adjacent said case member.

2. The equipment inspection apparatus recited in claim 1, and further including a first arm assembly, said first arm assembly operably coupled to said lower mounting plate and said second end of said support pole member, said first arm assembly operable to facilitate movable positioning of the inspection assembly.

3. The equipment inspection apparatus recited in claim 2, and further including a second arm assembly, said second arm assembly being operably coupled to said base mount and said second end of said support pole member, said second arm assembly operable to facilitate movable positioning of the inspection assembly.

4. The equipment inspection apparatus recited in claim 3, wherein said clearing element further includes a valve, said valve configured to be operably coupled to a gas supply.

5. The equipment inspection apparatus recited in claim 4, and further including a handle member, said handle member being secured to said support pole member, said handle member having a first portion and a second portion being angularly oriented with respect to each other.

6. The equipment inspection apparatus recited in claim 5, and further including an additional pole member, said additional pole member being releasably secured to said support pole member, said additional pole member having a reel assembly, said reel assembly being operably coupled to said inspection assembly with cables.

7. An inspection apparatus configured to assist in the inspection of an interior of an object such as a pipe or vessel wherein the interior of the object is a hazardous environment wherein the inspection apparatus comprises:

a support pole member, said support pole member having a first end and a second end, said support pole member having a handle secured thereto;

an inspection assembly, said inspection assembly being movably secured to said second end of said support pole member, said inspection assembly including a base mount, said base mount being rectangular in shape, said base mount having a front side and a rear side, said base mount having a lower surface and an upper surface, said base mount having an upper mounting plate secured to said upper surface, said base mount having a lower mounting plate secured to said lower surface, said inspection assembly further having a clearing element, said clearing element including a nozzle, said nozzle being operably coupled to said front side of said base mount;

a plurality of light mounts, said plurality of light mounts being secured to said inspection assembly, said plurality of light mounts having lights secured thereto, said plurality of light mounts providing movable adjustment of the lights; and a case member, said case member being secured to said inspection assembly, said case member having an interior volume configured to house imaging equipment.

8. The inspection apparatus as recited in claim 7, and further including a first arm assembly, said first arm assembly configured to movably couple said lower mounting plate to said second end of said support pole member.

9. The inspection apparatus as recited in claim 8, and further including a reel assembly, said reel assembly being secured to a pole member wherein the pole member is releasably secured to said first end of said support pole member, said reel assembly including steel cables wherein the steel cables are operably coupled to the inspection assembly and the support pole member.

10. The inspection apparatus as recited in claim 9, and further including a second arm assembly, said second arm assembly configured to movably couple said base mount and said second end of said support pole member.

11. The inspection apparatus as recited in claim 10, wherein said handle further includes a first portion and a second portion, said first portion and second portion being angularly oriented in opposing directions with respect to each other.

12. The inspection apparatus as recited in claim 11, wherein said clearing element further includes a valve, said valve configured to be operably coupled to a gas supply.

13. The inspection apparatus as recited in claim 12, wherein said plurality of light mounts further include a first portion and a second portion, said first portion and said second portion having a fastener providing operable coupling thereof and further facilitating articulation of the first portion and second portion.

14. An inspection apparatus configured to assist in the inspection of an interior of an object such as a pipe or vessel wherein the interior of the object is a hazardous environment wherein the inspection apparatus comprises:

a support pole member, said support pole member having a first end and a second end, said first end of said support pole member configured to have releasably secured thereto an additional pole member, said support pole member having a handle secured thereto, said handle having a first portion and a second portion, said first portion and said second portion of said handle configured in a v-shaped formation;

an inspection assembly, said inspection assembly being movably secured to said second end of said support pole member, said inspection assembly including a base mount, said base mount being rectangular in shape, said base mount having a front side and a rear side, said base mount having a lower surface and an upper surface, said base mount having an upper mounting plate secured to said upper surface, said base mount having a lower mounting plate secured to said lower surface, said inspection assembly further having a clearing element, said clearing element including a nozzle and a valve assembly, said nozzle being operably coupled to said front side of said base mount, said valve assembly configured to be operably coupled to a gas source;

a plurality of light mounts, said plurality of light mounts being secured to said inspection assembly, said plurality of light mounts having lights secured thereto, said plurality of light mounts having a first portion and a second portion, said first portion and said second portion of said plurality of light mounts having a fastener facilitating articulation thereof, said plurality of light mounts providing movable adjustment of the lights; and a case member, said case member being secured to said inspection assembly, said case member having an interior volume configured to house imaging equipment.

15. The inspection apparatus as recited in claim 14, and further including a second arm assembly, said second arm assembly having a pivotally coupled first section and second section configured to movably couple said base mount and said second end of said support pole member.

16. The inspection apparatus as recited in claim 15, and further including a first arm assembly, said first arm assembly having an arm member wherein said arm member is configured to movably couple said lower mounting plate to said second end of said support pole member.

17. The inspection apparatus as recited in claim 16, and further including a reel assembly, said reel assembly being secured to the additional pole member wherein the additional pole member is releasably secured to said first end of said support pole member, said reel assembly including steel cables wherein the steel cables are operably coupled to the inspection assembly and the support pole member.

18. The inspection apparatus as recited in claim 17, and further including a plurality of keepers, said plurality of keepers being located on the inspection assembly and the support pole member, said plurality of keepers configured to couple to the steel cable.

* * * * *